United States Patent Office

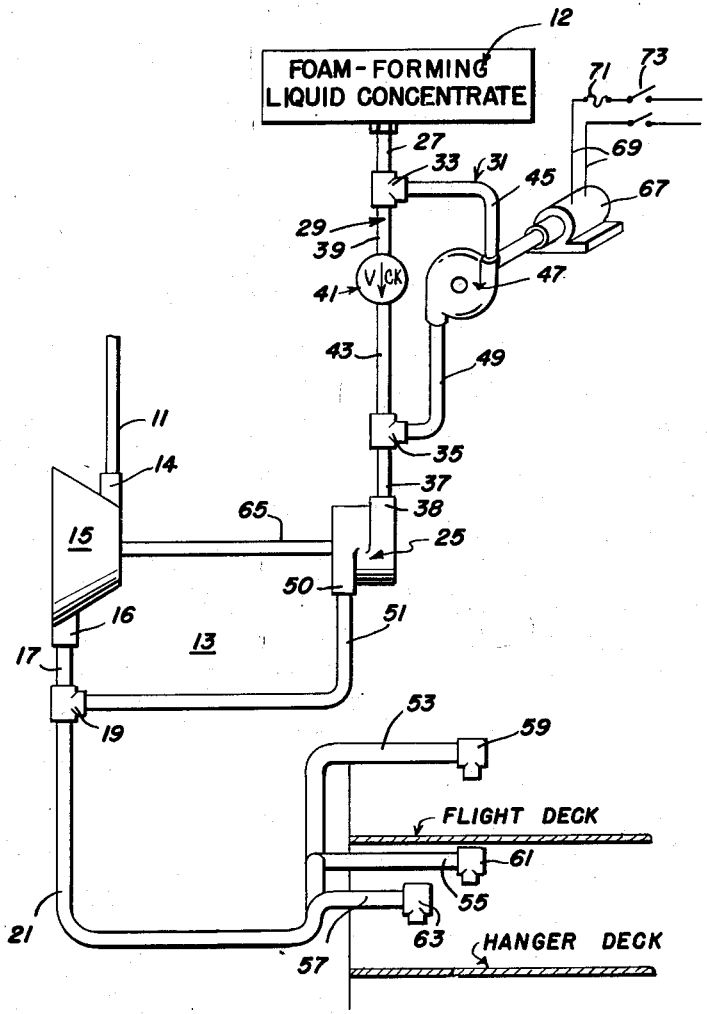

2,696,266
Patented Dec. 7, 1954

2,696,266

MEANS FOR MIXING LIQUIDS UNDER PRESSURE AND IN DESIRED PROPORTIONS, ESPECIALLY FOR FIRE FIGHTING

Richard L. Tuve, Silver Spring, Md.

Application April 11, 1951, Serial No. 220,513

10 Claims. (Cl. 169—14)

(Granted under Title 35, U. S. Code (1952), sec. 266)

The invention described herein may be manufactured and used by or for the Government of the United States of America for governmental purposes without the payment of any royalties thereon or therefor.

The present invention relates to means for mixing different liquids under pressure and in a desired proportion; and more particularly relates to a liquid proportioning system for fire-fighting equipment utilizing a mechanical foam, the equipment comprising a plurality of nozzles at different locations of a fire-protected place of large size, such as, for example, a ship of the aircraft-carrier type.

In mechanical-foam-type fire-fighting equipment to which this invention relates, water and a hydrolized foaming liquid concentrate, i. e., a foam stabilizer, are mixed in desired proportions in a liquid proportioning means to form a foam solution. The foam solution is later mixed with air to form the fire-fighting foam. With common forms of stabilizer now in use about six parts of the concentrate are mixed with about ninety-four parts of water for economically producing a foam solution that is highly effective for conversion into a mechanical fire-fighting foam. A greater proportion of liquid concentrate is wasteful; and a lesser proportion is detrimental to the fire-fighting qualities of the ultimate foam.

In most large installations, and especially on ships, sparing use of the foam solution is imperative because it is frequently difficult to replenish the fire-protecting system with liquid concentrate. Accordingly, foam solution is made at a central location and distributed through a distribution pipe-system to nozzles at different locations on the place being protected so that a fire may be fought at whatever location it might occur by using only the nozzle or nozzles that can deliver foam to the fire. This means that the system must be capable of delivering foam solution in quantities ranging from a relatively small quantity in the case of a localized fire, to a large quantity up to the capacity of the system in the case of a general fire.

An object of the invention is to provide a mechanical-foam-type fire-fighting system using a minimum of parts, but capable of supplying different quantities of foam solution by mixing water and foam-forming liquid concentrate in a substantially fixed ratio for all supply-rates of the foam solution.

In accordance with a preferred form of a system embodying the invention, a supply-tank of foam-forming liquid concentrate and a supply of water under high pressure are available at a central point. A rotary or positive displacement pump takes a supply of the liquid concentrate and raises it to a pressure for mixing with the water. For assuring that the raio of liquid concentrate to water will remain in a narrow utilizable range, the pump is mechanically connected to and driven by a water motor in the water supply line. Consequently, the two comprise a liquid proportioner that keeps the supply of liquid concentrate in proper proportion to the supply of water with which it mixes, so long as the water motor can supply the required driving power to the pump. However, when the demand for foam solution is comparatively light, the water motor will slip; and to keep the liquids in proper porportion the liquid concentrate is fed by a centrifugal pump to the rotary pump. The rotary pump now acts as a metering device to keep the proportions of the liquids for the foam solution within the desired range.

Objects, features and innovations of the invention, in addition to the foregoing, will be discernible from the following description of a preferred embodiment thereof. The description is to be taken in conjunction with the accompanying schematic drawing of a fire-fighting system embodying a preferred form of the invention as installed on an aircraft-carrier.

Referring to the drawing, water under pressure is available at a supply pipe 11 in quantities set by the capacity of the fire-fighting system; and viscous foam-forming liquid concentrate is maintained in a storage tank 12. The two liquids are mixed in certain proportions by a proportioner indicated in its entirety by the reference numeral 13. Water is supplied to the proportioner at inlet 14 of a water motor 15 having an outlet 16 which discharges into a pipe 17 connected to a mixing joint 19 to which a distributing pipe 21 of the proportioner is connected.

The mixing joint 19 also receives foam-forming liquid concentrate that is to mix with the water to form the foam solution. To this end, viscous foam-forming liquid concentrate in the storage tank 12 is fed to the joint 19 through piping of the proportioner 13 which includes a rotary or positive displacement pump 25 intended to raise the pressure of the liquid concentrate. The concentrate is taken from the tank 12 via an outlet pipe 27, and flows to the rotary pump 25.

In accordance with the invention, concentrate flows to the pump 25 through one or both of two branch passages 29 and 31. The branch passages are connected in parallel starting at a common branching fitting 33 to which the tank-outlet pipe 27 is connected, and ending at a common fitting 35 which receives a fitting-outlet pipe 37 connected to the intake 38 of the rotary pump 25. The branch passage 29 comprises a pipe 39 connected to the fitting 33, a check-valve 41 and a pipe 43 connected to the fitting 35. The branch passage 31 comprises a pipe 45 connected to the fitting 33, a centrifugal booster pump 47, the intake of which is connected to the pipe 45, and a pipe 49 extending from the discharge of the centrifugal pump 47 to the fitting 35. The liquid concentrate passing out of the rotary pump 25 is delivered from the discharge 50 of the pump to the mixing joint 19 through a pipe 51.

Water from pipe 17 and any foam-forming liquid concentrate supplied by pipe 51 pass through the joint 19 and pipe 21, thoroughly mixing therein to form foam solution that is delivered, through a plurality of branch outlet pipes 53, 55 and 57, to a plurality of nozzles 59, 61 and 63 distributed about the place or ship being protected. It should be clear that as many branch outlet pipes and nozzles are used as the system is designed for. Each nozzle is of a type that mixes air, or other gas, with the foam solution to form a foam when the nozzle is open for applying the protective fluid to a fire. Such nozzles are known, and may be of the aspirating type. They may also be of different sizes and have different discharge capacities. In general, a suitable nozzle mixes about six parts of air by volume with one part of foam solution, approximately, when the foam solution comprises about 6% foam-forming liquid concentrate of the common hydrolized proteins at present in use.

It has been found that the desired mixture for the foam solution can be maintained uniform for practicable purposes through a large range of the capacity of the system, by mechanically coupling the rotary pump 25 to the water motor 15 so that the latter drives the former in a fixed speed-relation, thereby forming a liquid proportioner. Consequently, so long as the flow through the water motor, that is, its throughput, corresponds to its driving power, the proper proportions of water and foam-forming liquid concentrate will be provided at the joint 19. Accordingly, rotors of the water motor and the rotary pump are mechanically directly connected by any suitable means. This means is illustrated in the drawing as a common shaft 65 for the pump and motor, so that both always operate at the same speed.

However, when a water motor of the type described having a large capacity operates below its lower delivery-limit for which it is designed, it will slip. As a result, the amount of liquid concentrate delivered to the joint 19 would be less than that necessary for a satisfactory foam solution. In accordance with the invention, this condition is avoided by the provision of the branch passages 29 and 31 including the check-valve 41 and centrifugal pump 47, respectively. The pump 47 is driven by an electric motor 67 energized from an energizing circuit 69 that may be provided with a maximum current protective device, represented by a fuse 71, and a control switching means 73.

The control switching means 73 may be manually controlled for opening and closing the energizing circuit 69, or it may be controlled by the flow of liquid or by pressure in the system, preferably in a main distributing pipe such as pipe 21, in a manner known to the art. Preferably the switching means 73 is kept closed throughout any indication of fire, regardless of the size or location of the fire, so that the electric motor 67 will be continuously energized whenever there may be a demand for liquid in any quantity from the fire-fighting system.

*Operation*

The operation of the system in accordance with the invention can perhaps be better understood by assuming that the branch passages 29 and 31 were replaced by a continuously-open pipe from the tank 12 to the intake of the rotary pump 25, resulting in a system somewhat similar to prior art systems. In such a system, the water motor 15 will properly drive the pump 25 so long as the motor's throughput is not below the lower limit for which it is designed. At a throughput below this limit, the water motor will not deliver adequate power to the rotary pump 25 so that this pump does not supply the required amount of foam-forming liquid concentrate to the fitting 19, with the result that the liquid reaching the nozzles 59, 61 and 63 is either water or too weak a foam solution. By adding the branch passages 29 and 31 and the separate drive for the centrifugal pump 47, this disadvantage is fully overcome, and a suitably mixed foam solution at all rates of demand up to the upper limit of the system's capacity is always available.

More particularly, if the number of open nozzles is enough to call for a quantity of within the operating range of the water motor 15, the water motor will supply adequate driving power through the shaft 65 to the rotary pump 25. This pump will draw liquid concentrate from the tank 12, through branch passage 29, opening check valve 41. Any flow through the branch passage 31 is supplemental. The liquid-concentrate throughput of the rotary pump 25 will be in fixed relationship to the water throughput of the water motor 15, so that a fixed ratio of water and liquid concentrate is supplied to the mixing joint 19 and pipe 21. The capacities of the water motor and rotary pump are chosen to provide a foam solution that has in the neighborhood of 6% liquid concentrate.

Should the number of open nozzles be so few that the system is called upon to deliver a low quantity of liquid, as might be the case with only a low capacity nozzle in operation, the throughput of the water motor 15 will be below its lower operating range so that it will slip and will not deliver adequate power to the rotary pump 25 for forcing the required liquid concentrate to the mixing joint 19. However, the work for drawing the liquid concentrate and delivering it at suitable pressure to the joint 19, is now supplied by the centrifugal pump 47 deriving its power from the electric motor 67. The water motor is unloaded and does not slip. The check valve 41 closes because of the increased suction on its back side, and the rotary pump 25, being mechanically connected to the water motor 15, acts as a metering device for keeping the flow of liquid concentrate at a fixed percentage of the flow of water through the water motor. Consequently, even at flow rates of water below that for which the water-motor 15 is designed, a proper foam solution is provided at the nozzle or nozzles that may be open.

The electrically driven centrifugal pump 47 is in the nature of a booster pump capable of delivering foam-forming liquid concentrate at adequate pressure so that the work-load of the water motor 15 for driving the rotary pump 25 at low discharge-rates is materially reduced. This action eliminates slip in the water motor section of the proportioner comprising the mechanically connected water motor and rotary pump; and this insures a proper percentage of liquid concentrate in the foam solution when the system is called upon to deliver a very low quantity thereof. The check-valve 41 prevents recirculation of the liquid concentrate in a local path including the branch passages 29 and 31.

The centrifugal pump 47 is of low capacity, and at high flow in the system its effect is negligible. If desired, a by-pass may be added around the centrifugal pump as assurance that there will be no restrictive or throttling effect on the flow of liquid concentrate when several nozzles are open.

The invention has special utility in connection with fire-fighting equipment installed on an aircraft carrier having a plurality of decks including a top flight deck, a hangar deck below the flight deck and one or more decks therebelow. Parts of a flight deck and a hangar deck are illustrated in the drawing; the former being protected by nozzle 59 and the latter by nozzles 61 and 63. In the case of a fire resulting from a crash of a plane on the flight deck, it may be desirable to open only the nozzle 59, so that the system can deliver foam solution at a low rate of as little as about 50 G. P. M.

In a specific installation, to which the invention is not limited, the water motor used was designed to operate effectively in a range of 500–1000 gallons per minute (G. P. M.) throughput delivered at a pressure of as much as 135 pounds per square inch (p. s. i.); the rotary pump used could deliver 65 G. P. M. at 110 p. s. i.; and the centrifugal pump 35 G. P. M. at 150 p. s. i. In a system of this general kind, a suitable foam solution was available at rates of discharge from the nozzles ranging from about 50 to 1000 G. P. M.; whereas a system which had a continuously open simple pipe-connection only from its storage tank to its rotary pump, a suitable foam solution was available only at discharge flows from the nozzles of 500 to 1000 G. P. M.; and at lesser flows the percentage of foam-forming liquid concentrate in the foam solution was progressively less until it was practically zero at flows of about 200 G. P. M. and less.

Tests of two proportioner systems, one with and the other without the booster pump arrangement, using a water motor designed for 500–1000 G. P. M., gave the following results:

| Gallons per minute discharge | Percentage of liquid concentrates | |
| --- | --- | --- |
| | without booster pump | with booster pump |
| 50 | 0 | 7.5 |
| 100 | 0 | 7.5 |
| 200 | 0–3 | 7.5 |
| 300 | 1–3½ | 6 |
| 400 | 4–5 | 6 |
| 500–1000 | 6 | 6 |

While only a preferred embodiment of the present invention has been illustrated and disclosed herein, various modifications thereof are contemplated and may now obviously be resorted to by those skilled in the art without departing from the spirit and scope of the invention as hereinafter defined by the appended claims, wherein it is claimed:

1. A fire-fighting system of a type described comprising, in combination, a liquid proportioner comprising a water motor and a pump driven thereby, said water motor having an inlet and outlet, said pump having an intake and a discharge, a common distribution means connected to said outlet and discharge, a plurality of nozzles at different locations, outlet pipe-means connecting said distribution means to said nozzles, means for conveying a supply of water to said inlet, means for conveying a supply of foam-forming liquid concentrate to said intake, the last said means comprising a passage including a pump, and a separate drive for the last said pump.

2. An invention as defined in claim 1 but further characterized by a second passage to said intake, said second passage comprising a check-valve.

3. An invention as defined in claim 1 but further characterized by the first said pump being a rotary pump, and the last said pump being a centrifugal pump.

4. An invention as defined in claim 3 but further characterized by a second passage to said intake, said second passage comprising a check-valve, the first said passage and said second passage being connected in parallel.

5. A fire-fighting system of a type described for supplying foam solution at considerably different rates, comprising, in combination, a water motor designed for effective operation within a range having a lower limit above flow-rates that the system may be called upon to supply, a rotary pump, a mechanical connection between said water motor and said pump, a common connection for receiving the discharge from said water motor and said pump, a storage-tank for foam-forming liquid concentrate, a passage from storage-tank to the intake of said pump, said passage including a centrifugal pump, and an electric drive for said centrifugal pump.

6. A mechanical-foam-type fire-fighting system for supplying foam solution at considerably different rates, comprising, in combination, a water supply pipe, storage means for foam-forming liquid-concentrate, a liquid proportioner connected to said pipe and storage means for providing a foam solution having a substantially uniform proportion of water and foam-forming liquid concentrate when the system operates to supply foam solution at a rate in a certain range, said proportioner supplying a weaker foam solution when the system operates at a rate below said range, means connected to said proportioner for distributing the foam solution, and auxiliary pumping means for increasing the percentage of liquid concentrate in the foam solution when the system operates at a rate below said range.

7. A mechanical-foam-type fire-fighting system for supplying foam solution at considerably different rates, comprising, in combination, a water supply pipe, storage means for foam-forming liquid-concentrate, a liquid proportioner connected to said pipe and storage means for providing a foam solution having a substantially uniform proportion of water and foam-forming liquid concentrate when the system operates to supply foam solution at a rate in a certain range, said proportioner supplying a weaker foam solution when the system operates at a rate below said range, means connected to said proportioner for distributing the foam solution, a centrifugal pump connected to the intake of said proportioner and to said storage means, and a separate drive for said centrifugal pump, whereby to increase the percentage of liquid concentrate in the foam solution when the system operates at a rate below said range.

8. A mechanical-foam-type fire-fighting system of a type described comprising a water supply pipe, a storage means for a foam-forming liquid concentrate, a water motor having an inlet connected to said supply pipe, a pump connected to said storage means for pumping liquid concentrate therefrom, a metering device having a rotor mechanically connected to said water motor, connections whereby said pump delivers liquid concentrate to the intake of said metering device, a mixing means, and connections from the discharge of said metering device and from the outlet of said water motor to said mixing means.

9. An invention as defined in claim 8 but further characterized by a branch passage including a check valve, from said tank to said metering device.

10. A liquid proportioner comprising a water motor having an inlet and an outlet, a rotary pump having an intake and a discharge, mixing means connected to said outlet and said discharge, a pipe system connected to the outlet of said mixing means, said pipe system comprising a plurality of nozzles at different locations, a mechanical drive-connection between said motor and pump, a passage comprising a centrifugal pump having an independent intake and an outlet-discharge connected to said intake, a drive for said centrifugal pump, the delivery capacity of said rotary pump being greater than that of said centrifugal pump, and a second passage in parallel with the first said passage, said second passage comprising a check-valve.

References Cited in the file of this patent

UNITED STATES PATENTS

| Number | Name | Date |
| --- | --- | --- |
| 1,477,850 | Pool | Dec. 18, 1923 |
| 2,095,534 | Schmidt | Oct. 12, 1937 |
| 2,543,941 | Sargent | Mar. 6, 1951 |